United States Patent [19]
Gibson

[11] Patent Number: 6,040,835
[45] Date of Patent: Mar. 21, 2000

[54] SYSTEM FOR DEPICTING SURFACES USING VOLUMETRIC DISTANCE MAPS

[75] Inventor: Sarah F. Gibson, Arlington, Mass.

[73] Assignee: Mitsubishi Electric Information Technology Center America, Inl. (ITA), Combridge, Mass.

[21] Appl. No.: 08/965,569

[22] Filed: Nov. 6, 1997

[51] Int. Cl.⁷ .................................................. G06T 15/00
[52] U.S. Cl. ........................................... 345/424; 345/426
[58] Field of Search .................................... 345/419, 424, 345/426

[56] References Cited

U.S. PATENT DOCUMENTS 4,835,712  5/1989  Drebin et al. ............................ 364/518
5,793,375  8/1998  Tanaka ..................................... 345/426

Primary Examiner—Mark K. Zimmerman
Assistant Examiner—Mano Padmanabhan
Attorney, Agent, or Firm—Dirk Brinkman

[57] ABSTRACT

A volumetric data representation for graphical objects encodes the distance of data elements to the nearest object surface, with means being provided for estimating the direction and magnitude of surface normals from the distance values. The subject system can be used to accurately reconstruct the normal direction of a slowly varying surface in volume sampled data for high quality Volume Rendering, accurate force reflection in haptic feedback, and accurate force calculation and object penetration estimation in physically-based graphics.

8 Claims, 9 Drawing Sheets

```
TYPE DEF VOLUME ELEMENT STRUCT {

86 ──▶ INT DENSITY;

} VOLUME ELEMENT;
```

Fig. 6A

```
TYPE DEF VOLUME ELEMENT STRUCT {

INT DENSITY;

88 ──▶ INT DISTANCE;

} VOLUME ELEMENT;
```

Fig. 6B

SYSTEM FOR DEPICTING SURFACES USING VOLUMETRIC DISTANCE MAPS

FIELD OF THE INVENTION

This invention relates to Volume Graphics and more specifically to a discrete object representation that allows accurate reconstruction of surface normals for Volume Rendering, haptic exploration of volumetric models using force feedback, and physically-based calculations of interactions between graphical objects.

BACKGROUND OF THE INVENTION

In Volume Graphics, objects are represented as arrays of sampled data elements. Volumetric object representations have some advantages over surface-based graphical object representations because they can represent object interiors. This is important both for visualizing the internal structure of complex objects and for physically-based modeling of actions such as object deformation or the cutting and tearing of volumetric objects. Using volumetric object representations to model physically-based object interactions is discussed, for example, by S. Gibson in "Beyond volume rendering: visualization, haptic exploration, and physical modeling of voxel-based objects", in Proc. Eurographics workshop in Visualization in Scientific Computing, pp. 10–23, Chia, Italy, 1995. Using a volumetric object representation to model object deformation is discussed by S. Gibson in "3D ChainMail: a fast algorithm for deforming volumetric objects", in Proc. Symposium on Interactive 3D Graphics, Providence, RI, pp. 149–154, 1997.

Volume Rendering is technique used for displaying volumetric objects on a 2D computer monitor. There are several approaches to volume Rendering, including ray casting where rays from each pixel in the image plane are cast into the object, accumulating color as they pass through the volumetric object; and splatting where each element in the object is projected onto the image plane, contributing color to the rendered image. For Volume Rendering, information about the color, transparency, surface normal, and material reflectance properties for each volume element are needed. These are often derived from two values stored for each element: a measured sample intensity or density value, and a material classification. For example, the density value might be used to calculate the element's opacity and surface normal, while the classification might be used to assign colors and reflectance properties to object elements.

In computer graphics, the quality of a rendered image is greatly improved by adding an illumination model to the rendering process. An illumination model allows the calculation of lighting effects such as spot lighting from specific light sources, reflections from object surfaces, and shadows. In computer graphics, a typical illumination model is the Phong illumination model, which expresses the light reflected from an object surface as follows:

$$I_r = k_a I_a I_{obj} + k_d I_L I_{obj}(N \cdot L) + k_s I_L I_{obj}(R \cdot V)^n,$$

where $I_r$, $I_a$, $I_{obj}$, and $I_L$ are the reflected, ambient, object, and light source colors, $k_a$, $k_d$, and $k_s$ are the ambient, diffuse, and specular reflection coefficients, N is the surface normal of the object, L is the direction of the light source, V is the viewing direction, and R is a function of N and L.

In the Phong illumination model, an accurate representation of the object surface normal is essential. Inaccurate surface normals can have a large effect on the perceived shape and texture of a graphical object. Since, in most graphical representations, the surface normal is known accurately at only a relatively small number of positions, estimating the surface normal at arbitrary object positions is very important for high quality rendering. In Volume Graphics, estimating surface normals is especially challenging because accurate surface normals are not usually stored in the data. Instead, surface normals are usually estimated from data intensity or density values.

It is important to note that the calculation of accurate surface normals in Volume Graphics is not only needed for Volume Rendering. An accurate surface normal estimation is essential for haptic data exploration where a force feedback device is used by the user to tactually explore the surface of a graphical object. Accurate surface normal estimation is essential in this application because the sense of touch is even more sensitive than the eye to surface irregularities. An accurate surface normal is also important in modeling physically-based interactions between objects because the calculation of impact and frictional forces between objects depends on these normals.

Many methods have been used to add lighting effects, or shading, to Volume Rendered images. These methods depend on the data representation. Different methods are used when the data is represented as a binary field where data samples are either empty or full of a given material, or as a sampled continuous field, such as a sampled intensity or material density field. Many methods for shading volumetric objects are discussed, for example, in "Volume Visualization", edited by Arie Kaufman, and published by the IEEE Computer Society Press, Los Alamos, Calif., in 1991. The more sophisticated of these methods require surface normal estimates at sampled data points.

In order to estimate surface normals when the object is represented as sampled continuous field, Volume Rendering often takes advantage of the fact that the image intensity or material density values change fastest at object surfaces. The directional change in image intensity can be represented by the 3D image gradient vector, which, at any image position, points in the direction of fastest change in intensity values and which has a magnitude proportional to surface strength. Hence, this gradient vector is often used in Volume Rendering to estimate surface normals for illumination.

There are many ways to estimate image gradient vectors from sampled data. One straight-forward method is called the central difference method. Here the gradient vector, ($g_x$, $g_y$, $g_z$,) is estimated from the 3D image intensity I(x,y,z) by:

$$g_x = I(x+1,y,z) - I(x-1,y,z),$$

$$g_y = I(x,y+1,z) - I(x,y-1,z),$$

$$g_z = I(x,y,z+1) - I(x,y,z-1).$$

Other image gradient operators include Sobel operators, cosine filters, and more complex filters such as those discussed by S. Marschener and R. Lobb in "An evaluation of reconstruction filters for Volume Rendering", Proc. IEEE Visualization '94, pp. 100–107, Washington, D.C., 1994, by T. Moller, R. Machiraju, K. Mueller, and R. Yagel in "Evaluation and design of filters using a taylor series expansion", IEEE Transactions on Visualization and Computer Graphics, Vol. 3, No. 2, pp. 184–199, 1997, and by M. Bentum, B. Lichtenbelt, and T. Malzbender in "Frequency analysis of gradient estimators in volume rendering", IEEE Transactions on Visualization and Computer Graphics, Vol. 2, No. 3, pp. 242–254, 1996.

S. Wang and A. Kaufman calculate smooth surface normals from volumetric data in "Volume-sampled 3D modeling", in IEEE Computer Graphics and Applications, pp. 26–32, September 1994. They start with binary segmented data and then apply a Gaussian filter to the object intensity or density values. They then estimate surface normals as the gradient of this smoothed image.

SUMMARY OF THE INVENTION

In contradistinction to the above methods, in the subject invention, a volumetric distance map in which distances to the nearest object surface are stored for each volume element or voxel, is used to improve the surface normal estimation for volumetric objects. After having created a discrete volumetric distance map, one can calculate a gradient vector of the distance field for any point in the volume. Because the gradient vector derived from this distance map points in the direction of the surface, it provides the surface normal direction. The distance itself can be used to derive the surface normal magnitude.

While others have used volumetric distance maps in Volume Rendering, they have been used exclusively for speeding up the ray-casting rendering algorithm. The distance values are used in these systems as minimum distances to the next non-empty volume elements to adjust the step size along rays as they are cast into the object. Two research papers that use a volumetric distance map to accelerate Volume Rendering are "Acceleration of ray-casting using 3D distance transforms", by K. Zuiderveld, A. Koning and M. Viergever in Proc. Visualization in Biomedical Computing, Chapel Hill, N.C., pp. 324–335, 1992 and "Fast surface rendering from raster data by voxel transversal using chessboard distance", by M. Sramek in Proc. IEEE Visualization '94, pp. 188–195, Washington, D.C., 1994.

Volumetric object representations have some advantages over surface-based graphical representations because they can incorporate complex interior structure. This is important both for visualizing internal structure and for modeling the physical behavior of 3D objects. However, in addition to interior structure, an accurate representation of surfaces is needed for high quality rendering, for haptic modeling, and for physics-based graphics. The subject invention addresses this need for an accurate representation of surfaces within volumetric data.

One reason that it is difficult to reconstruct surfaces from volumetric intensity or density values has to do with the discrete nature of the data. Information theory tells us that in order to reconstruct a signal exactly from sampled data, the signal must be sampled at twice the highest frequency component in the signal. Since a surface represents a sudden change in the image intensity or density value, the image signal at a surface has infinite frequency components and hence no sampling rate would be high enough for exact object reconstruction. Reconstruction errors are intensified with gradient estimation and these errors can lead to poor surface normal estimates and significant rendering artifacts.

The Gaussian filtering method of Wang and Kaufman prefilters the image data to reduce the high frequency components in a data volume and hence reduce aliasing artifacts in the gradient estimation. While this approach produces more pleasing images than those subject to aliasing, it also results in overly smoothed and rounded surfaces.

The subject invention encodes, into the volumetric data, knowledge of the presence, position and structure of known surfaces. Instead of storing object intensity or density values whose values usually change suddenly and drastically across a surface, the subject invention stores distances to the nearest surface element in each volumetric element. In one embodiment, distances are positive inside the object and negative outside of the object.

Note that: 1) the gradient vector of this distance map points in the direction of the surface normal; 2) a zero distance map value indicates the presence of a surface; and 3) a positive distance value indicates that the sample is inside the object. The distance to the nearest surface point varies linearly in the direction normal to a surface, and varies slowly in the direction parallel to the surface as long as the surface is relatively smooth. Hence, lower sampling rates and less complex gradient reconstruction filters can be used for accurate normal estimation with a distance map representation than with a sampled density representation.

It will be appreciated that in addition to using the distance map representation for calculating surface normals in Volume Rendering, distance maps can also be used to calculate surface normals for haptic exploration with a force feedback device and for calculating object penetration distances in interaction force calculations for physically-based modeling.

As there are many sources of data for a volumetric object representation, there are many ways to calculate the volumetric distance map. If the source of the data is an implicit or parametric representation of the surface, such as the equation of a sphere or a spline patch, then either geometric reasoning, or a constrained optimization technique can be used to find the minimum distance from any point in the volume to the defined surface. For a polygonal surface model, various algorithms used in graphical collision detection can be used to calculate the distance from any point in volume to the nearest surface polygon. For a discretely sampled continuous field, such as a density field for which no further knowledge of the surface is known, one method to generate distance measures would be to construct a polygonal or spline patch surface model at iso-surface values using a technique such as Marching Cubes, described by W. Lorensen and H. Cline, in "Marching Cubes: a high resolution 3D construction algorithm", in Proc. SIGGRAPH '87, pp. 163–169, 1987, and then calculate distances from this constructed surface. For a binary segmented object, the binary object could be smoothed to form a continuous sampled density field and then treated as above, or distances could be calculated from the binary segmented data using measurements such as the city-block distance or Euclidean distance approximations that are described, for example, in "The image processing handbook", by J. Russ, published by CRC Press, in Boca Raton, Fla., 1992. The resultant distance maps could also be filtered to obtain a smoother distance field.

The subject system finds application in computer graphics for generating lighting effects for volume rendering, for calculating reflected forces for volumetric objects in haptic rendering systems and for calculating physically-based response to interactions between volumetric graphical objects.

With respect to generating light effects in volume rendering, the calculation of the magnitude and direction of light reflected from an object's surface requires an estimate of the object surface normal. The subject system for calculating surface normals provides a means for generation these light effects for discrete volumetric objects.

With respect to calculating reflected forces in haptic rendering systems, the direction and magnitude of the force that is reflected in haptic rendering through use of a force feedback device depends on the normal of the graphical object's surface at the position of the end effector of the force feedback device and the distance of the end effector from the object surface. The reflected forces allow one to haptically explore, or "fee", the surface of the graphical object. The subject system of encoding distances to surfaces in a volumetric distance map and for calculating surface normals provides a means for generating the required reflected force direction and magnitude.

With respect to calculating physically-based responses to interactions between graphical objects, an interaction is detected when two objects penetrate each other in a physically-based simulation, and the forces caused by the interaction can be calculated from the depth of penetration of the two objects and the object surface normals at the contact point. The subject system of encoding distances to surfaces in a volumetric distance map and for calculating surface normals provides a means for detecting object penetration and for generating the required interaction force direction and magnitude. Object penetration of one object into a second object is detected when a point of the first object maps to a position in the distance map of the sec object that has a distance value which indicates that the point is inside the second object. The depth of penetration of the first object point into the second object can be calculated from the distance map of the second object. The depth of penetration can be combined with object surface normals calculated from the distance maps to calculate the direction and magnitude of interaction forces.

BRIEF DESCRIPTION OF THE DRAWINGS

These and other features of the Subject Invention will be better understood in relation to the Detailed Description in conjunction with the Drawings, of which:

FIG. 6A is a typical data structure written in the C programming language for representing a volumetric element for Volume Rendering;

FIG. 6B is a data structure written in the C programming language that encodes both the element density and the distance map;

DETAILED DESCRIPTION

Figure 1:
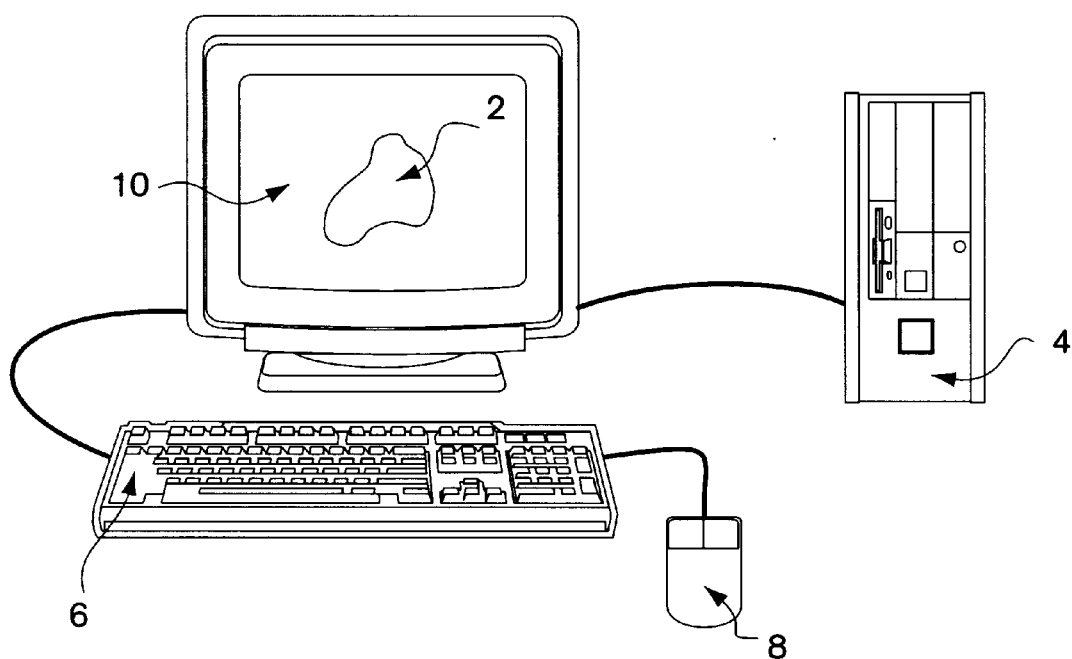
FIG. 1 is a diagrammatic representation of a computer system used for high quality rendering.

Referring now to FIG. 1, high quality rendering of a graphical object 2, is performed on a computer 4, with user input from the keyboard 6, and an input device 8, and displayed on a computer monitor 10.

Figure 2:
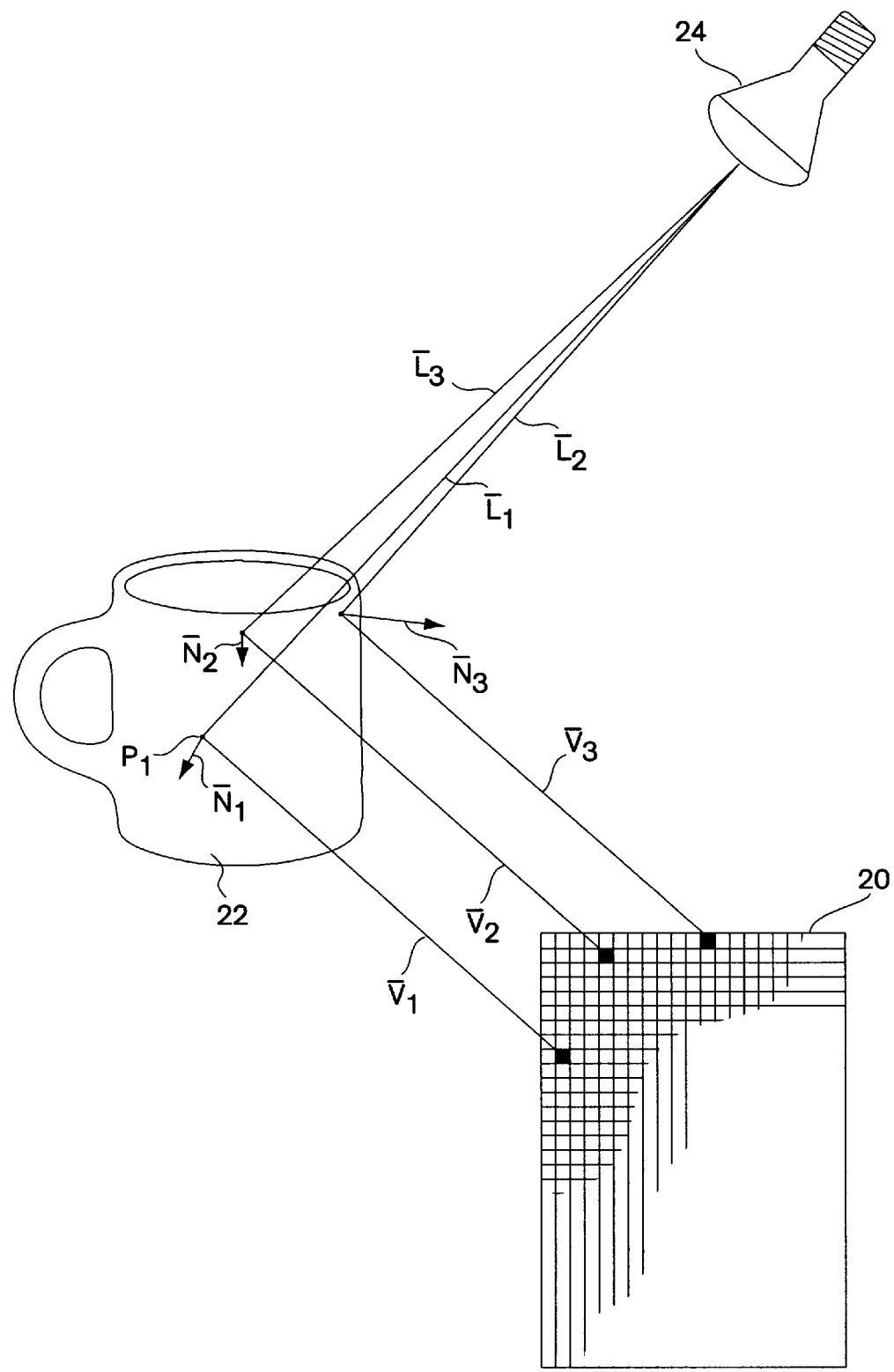
FIG. 2 is a diagrammatic representation of vector components in the Phong illumination model.

Referring to FIG. 2, in computer graphics, high quality image rendering usually incorporates an illumination model such as the Phong illumination model which estimates the color of the light reflected at a point P from a graphical object as a function of the color of the object, the color of the light source, the ambient color in the room, the reflection coefficients of the object, the direction, L, of the light source, the direction, V, as shown, of the eye, and the surface normal, N, at P. For a given light source and a fixed viewing direction, only the object color and the surface normal vary over the surface of the object. Accurate estimation of surface normals is essential for realistic rendering.

More particularly, it will be appreciated that the intensity of the light at each pixel of this image plane includes a component due to reflectance from the object surface. The reflectance intensity at point P1 is affected by the viewing direction $V_1$, from the image plane 20 to the object 22; the lighting direction, $L_1$, from the light source 24 to the point where the viewing ray intersects the object; and the surface normal, $N_1$, at that point.

In one embodiment, with the object being a cup, that which is necessary to accurately render the cup is to be able to obtain the intensity, light direction and color of a point on the cup. As to image plane 20, if one can establish a normal to point $P_1$ then one can describe the magnitude or intensity of light from that point as it relates to the viewing direction and the lighting direction. Since the voxel at point $P_1$ contains information as to color and intensity, all that is necessary to establish is the normal at point $P_1$ to properly establish the intensity and color of a corresponding point on the image plane.

Figure 3A:
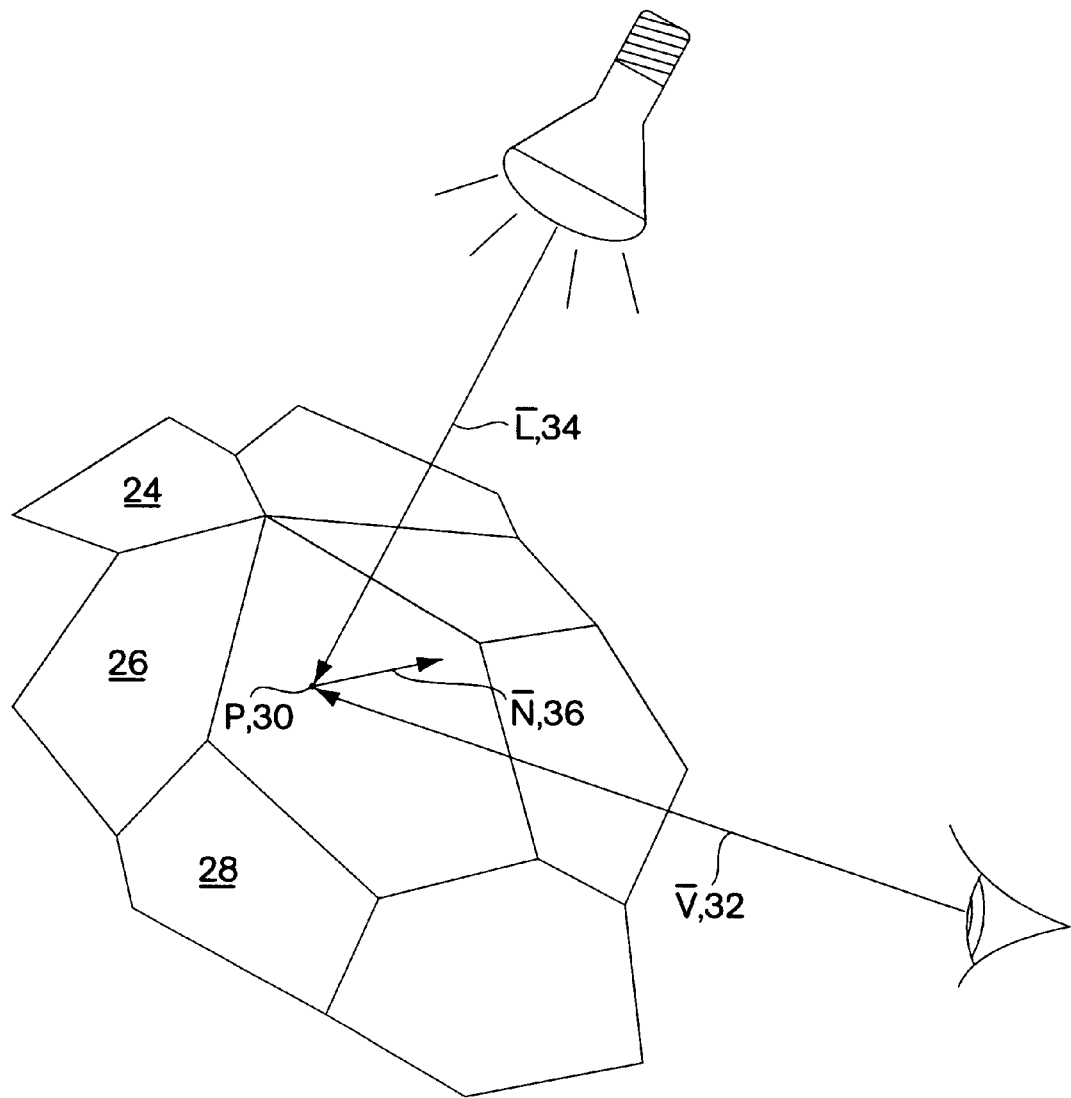
FIG. 3A is a diagrammatic representation of the vector components used for calculating the lighting effects in a polygonal graphical object model.
Figure 3B:
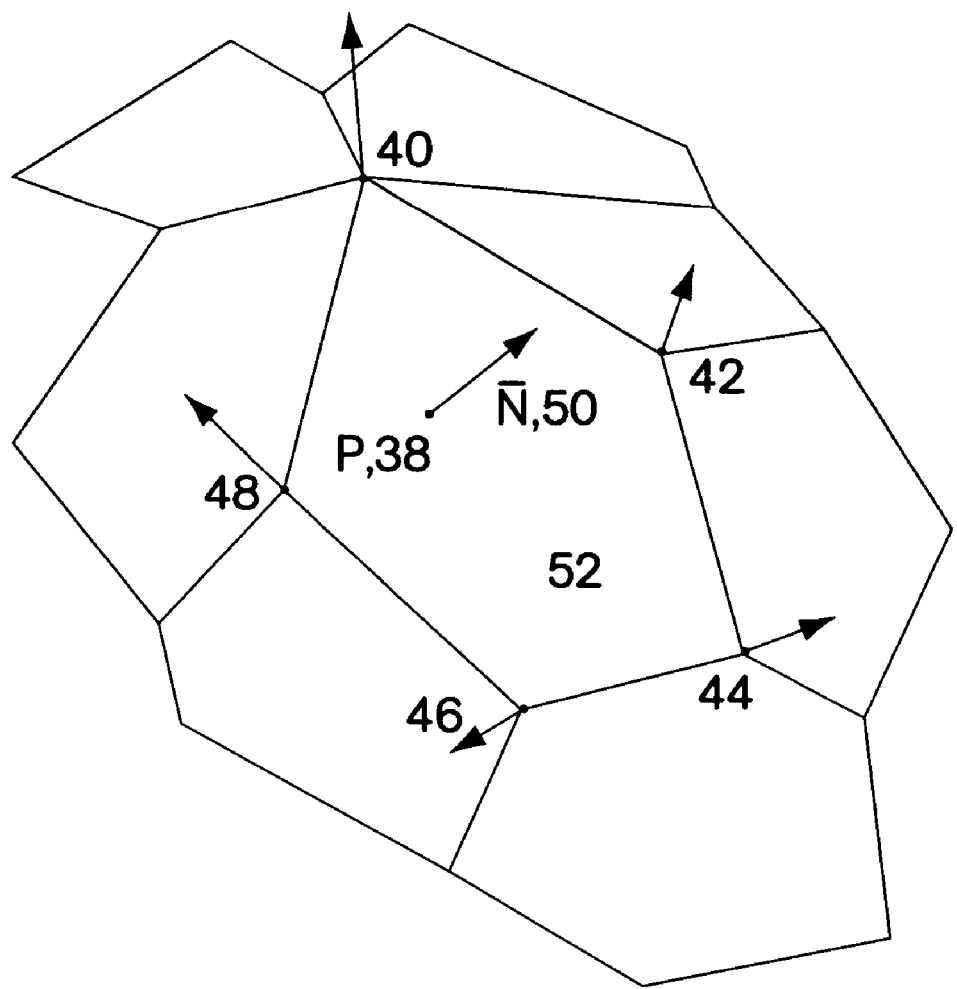
FIG. 3B is a diagrammatic representation of a means for estimating the surface normal at a point, P, on a polygonal object model.

Referring to FIG. 3A, in polygon modeling, graphical objects are represented by surface polygons, e.g. 24, 26 and 28. When rendering polygonal models, surface illumination at a point P, 30, is calculated from the viewing direction, V, 32, the lighting direction, L, 34, and an estimate, N, 36, of the surface normal at the point P, 30, using an illumination model such as the Phong illumination model. Referring to FIG. 3B, typically, accurate surface normals for the object are stored in the object model at the polygon vertices, 40, 42, 44, 46 and 48. Typically, the surface normal, N, 50, at the sample point P, 38, is estimated from the stored surface normals at the vertices of polygon 52 on which the sample point lies.

Figure 4:
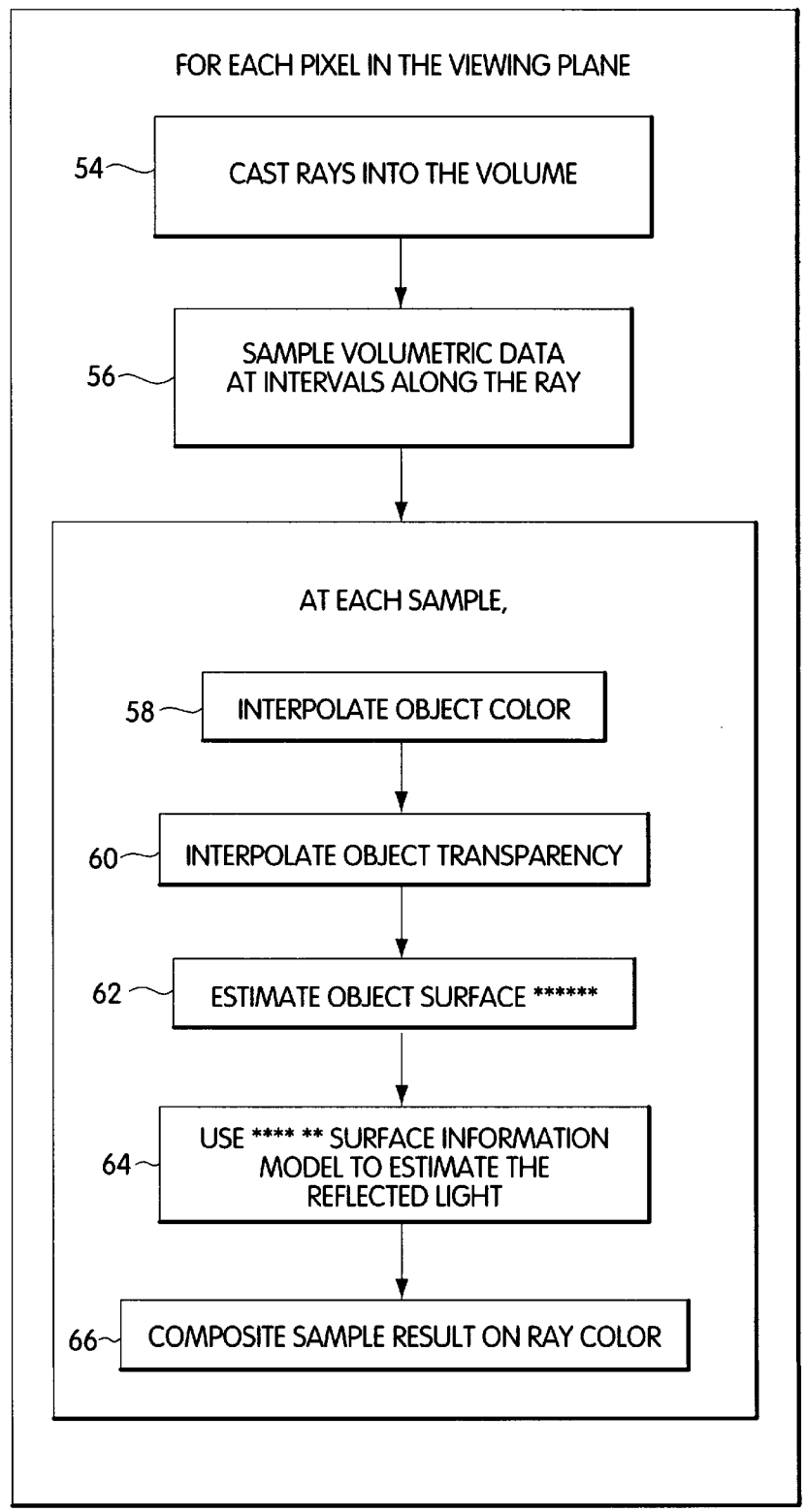
FIG. 4 is a flow chart of Volume Rendering using ray-casting with an illumination model.

Referring to FIG. 4, in ray casting for Volume Rendering, rays are cast into the volumetric data from each pixel in the view plane 54. Each ray is sampled at equally spaced intervals as it traverses the volume 56. At each sample point, the object color 58, transparency 60, and surface normal 62, are estimated. These are used along with an illumination model to calculate the light reflected at each sample point 64. Once the color of each sample point is known, it is composited onto the ray color 66.

Figure 5A:
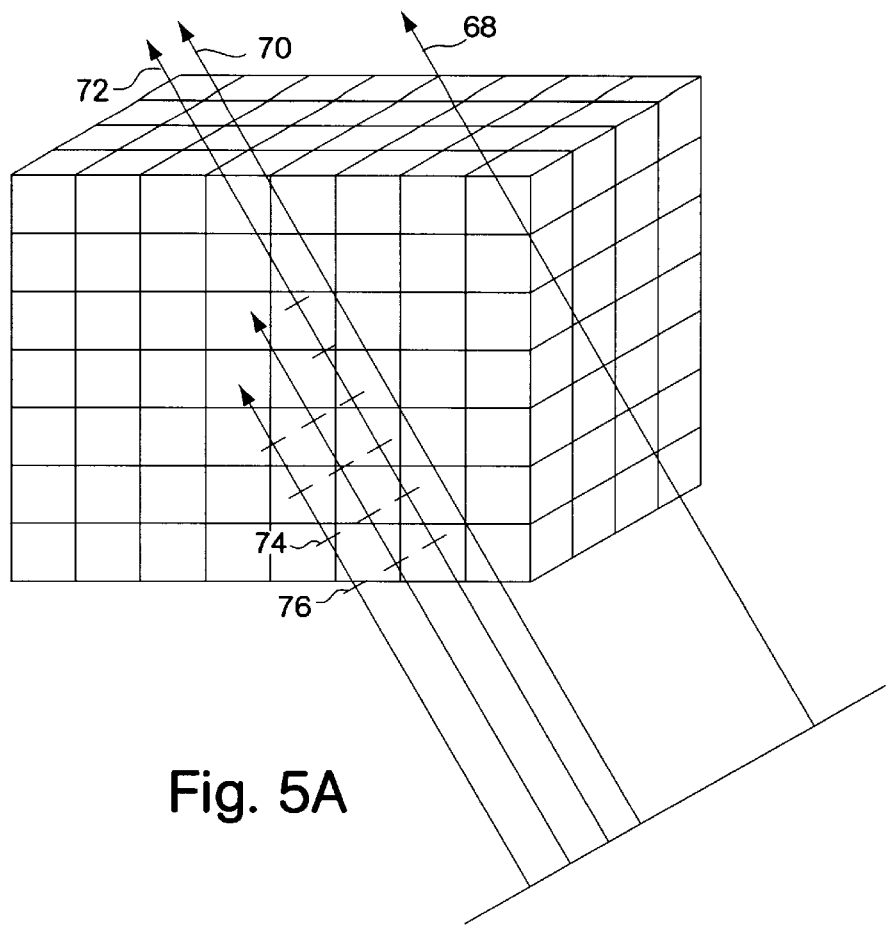
FIG. 5A is a diagrammatic representation of Volume Rendering using ray-casting.
Figure 5B:
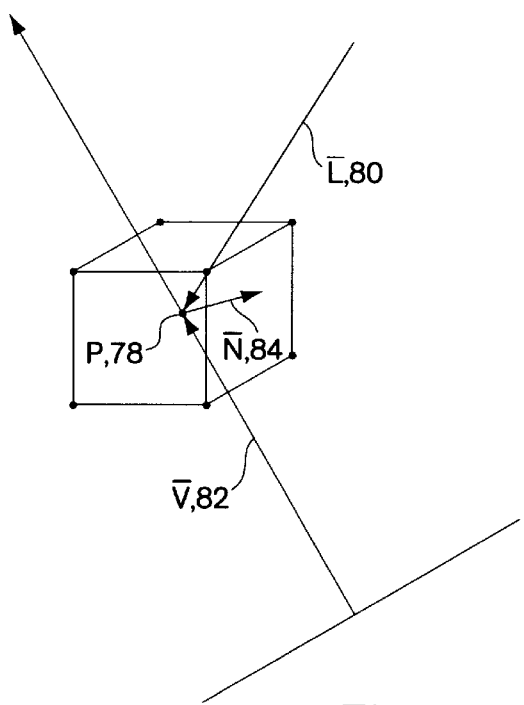
FIG. 5B is a diagrammatic representation of the vector components needed at a ray sample point, P, for calculating the illumination effects.
Figure 7A:
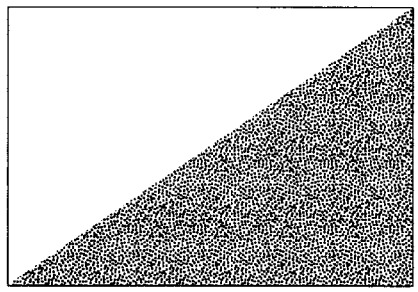
FIG. 7 is a diagrammatic representation illustrating the differences between the prior art and the subject invention for shading in Volume Rendering, with (a) representing the two dimensional graphical object, (b) representing the object's distance map, (c) representing the sampled version of (a), (d) representing the sampled version of (b), (e) depicting the gradient of (c), calculated using the central difference algorithm, and (f) depicting the gradient of (d), calculated using the central difference algorithm; and, FIG. 8 is a block diagram of a system for generating distance maps for graphical objects from a variety of data sources.
Figure 7B:
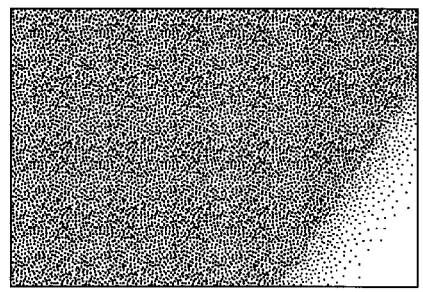
Figure 7C:
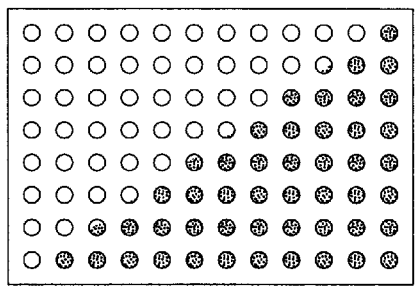
Figure 7D:
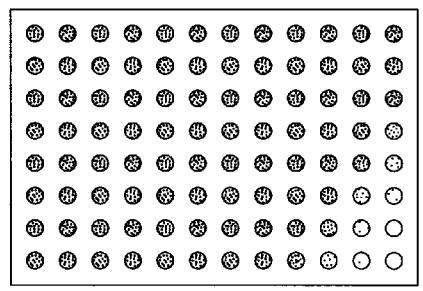
Figure 7E:
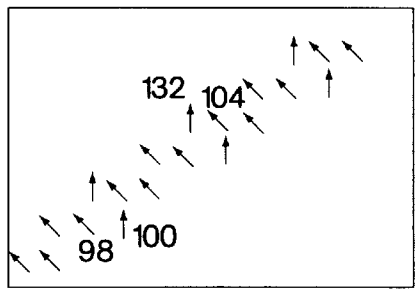
Figure 7F:
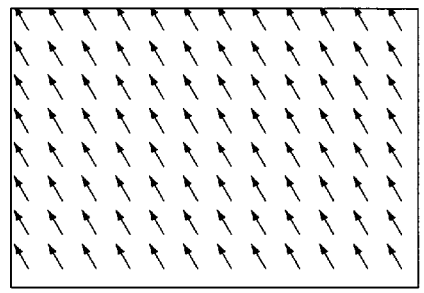

Referring to FIG. 5A, rays from the view plane, e.g. 68, 70 and 72, are cast into the volume in the viewing direction, sampling the color of the volumetric data at equally spaced intervals, e.g. 74 and 76 and compositing the sample color onto the ray color. Referring to FIG. 5B, in high quality Volume Rendering which uses an illumination model, the color of each element includes a component due to light reflected by the sample element. The color of the reflected light is calculated using an illumination model such as the Phong illumination model, and the resultant light color at the sample point, P, 78, depends on the direction, L, 80, of the light source, the direction, V, 82, of the viewing direction, and the surface normal, N, 84 at P, 78. Unlike polygonal models, accurate surface normals are not usually stored in the volumetric data. Hence, the surface normal, N, 78, at the sample point must be calculated from the density values stored in data elements near the sample point.

Referring to FIG. 6A, typically, in Volume Rendering, each element in the volume has a structure such as the one shown here, written in the C programming language. Each element contains a value 86 for the object density or intensity. Referring to FIG. 6B, in the subject invention, the data structure for each element has an additional field 88 so that a value for the distance to the nearest surface can be stored for each element. In the subject invention, this distance is used to detect the presence of a surface and to estimate its normal direction. In one embodiment, the distance is positive inside of the object, negative outside of the object and zero on the object surface. The gradient of this distance field points in the direction of the surface normal. Surfaces are detected where the magnitude of the distance is below a small threshold.

Referring to FIG. 7, differences between the prior art for estimating surface normals in Volume Rendering and the method of the subject invention are illustrated in 2D. 7(a) is a 2D object. The object is present where the image is black as illustrated at 90, and absent where it is white, as illustrated at 92. FIG. 7(b) is the continuous distance map that corresponds to the object in FIG. 7(a). Note that it has a value of 0.5 on the surface, or edge, of the 2D object 94; values that increase with distance from the surface and ranging from 0.5 to 1 inside the object; and values that decrease with distance from the surface and ranging from 0.5 to 0 outside of the object. FIG. 7(c) is the sampled version of FIG. 7(a), where sample points are black if they fall inside the object, e.g. 96, and white if the fall outside of the object, e.g. 98. FIG. 7(d) is the sampled version of FIG. 7(b), where the value of each sample point is the color of the distance map at the same position. Notice that the intensity values of the sample points in FIG. 7(d) vary smoothly across the image. Because of this smooth variation, values of the distance field that lie between sample points can be reconstructed more accurately and with a lower order interpolation filter than values of the sampled image density field of FIG. 7(c) can be reconstructed. FIG. 7(e) is a sampled estimate of the gradient field of FIG. 7(a) that was calculated from the sampled image of FIG. 7(c) using a central difference gradient estimator. Note that the direction of the sample gradients can vary significantly for neighboring samples, e.g. 98 and 100, or 102 and 104. Using this gradient estimate in Volume Rendering would cause significant artifacts in the image. FIG. 7(f) is an estimate of the surface normal directions of FIG. 7(a) calculated using a central difference-gradient estimator from the sampled image of FIG. 7(d). The direction of the surface estimate is consistent throughout FIG. 7(f) and it accurately represents the normal of the 2D object surface. The magnitude of the surface normal can be derived from the distance map in FIG. 7(d). In this example, the surface normal magnitude is large when the distance map intensity is close to 0.5 and small otherwise.

Figure 8:
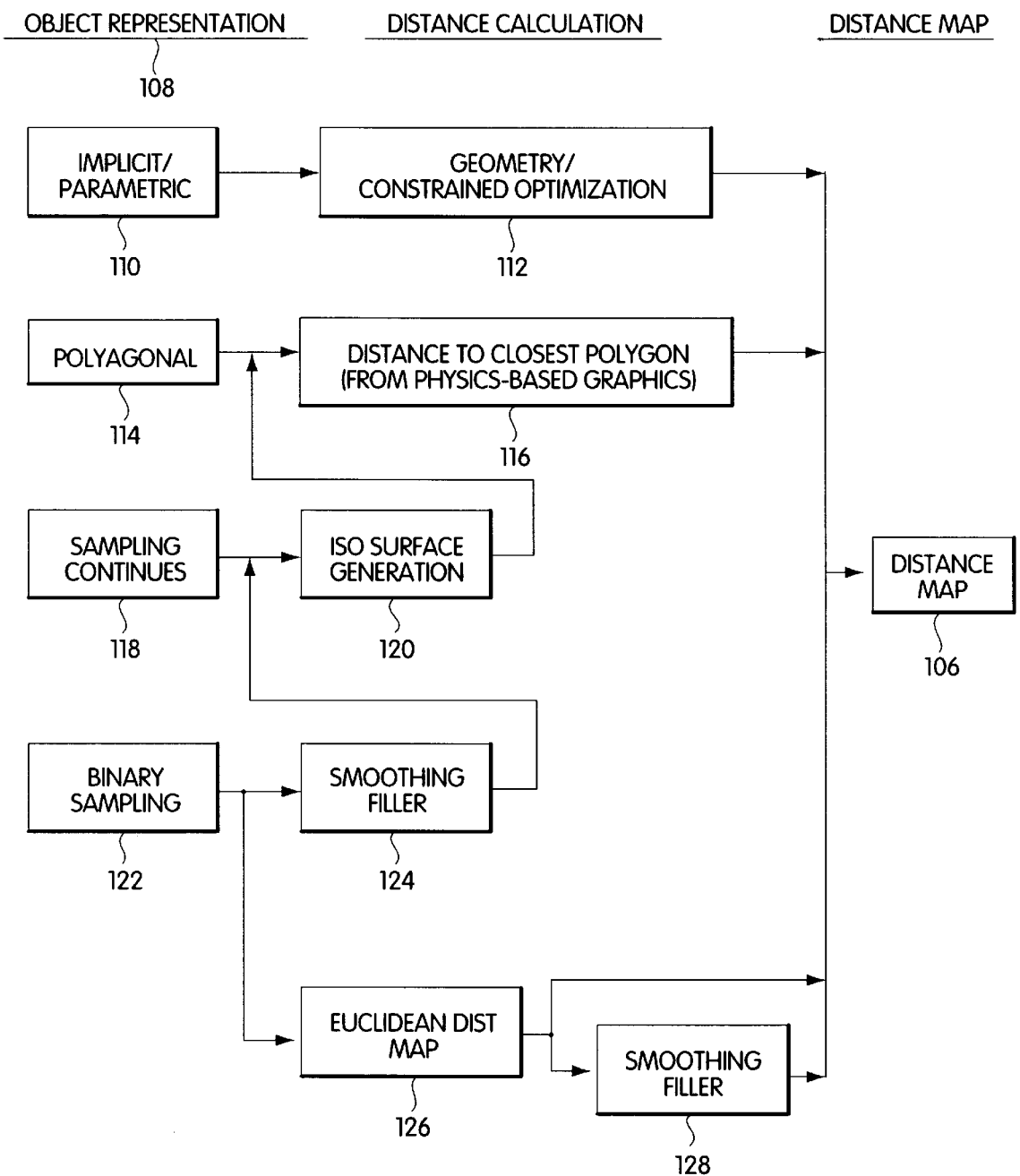

Referring to FIG. 8, there are different ways to calculate an object's distance map 106, depending on the object representation 108. If the object is represented implicitly or parametrically as at 110, such as the equation of a sphere or a spline patch, then either geometric reasoning or constrained optimization 112 can be used to find the minimum distance from any point in the volume to the defined surface. If the object is represented by a polygonal surface model 114, various algorithms used in graphical collision detection can be used to calculate the distance from any point in volume to the nearest surface polygon 116. For a discretely sampled continuous density field 118, one method to generate distance measures would be to construct a polygonal surface model at iso-surface values 120, and then calculate distances from this constructed surface 116. For a binary segmented object, the binary object could be smoothed as illustrated at 124 to form a continuous sampled density field and then treated as above as illustrated at 120 and 116, or Euclidean distances could be calculated from binary segmented data 126. The resultant distance maps could also be filtered to obtain a smoother distance field 128.

Having above indicated several embodiments of the Subject Invention, it will occur to those skilled in the art that modifications and alternatives can be practiced within the spirit of the invention. It is accordingly intended to define the scope of the invention only as indicated in the following claims.

What is claimed is:

1. In a volumetric data representation system for graphical objects in which graphical objects are generated from volumetric data elements,
   means for encoding the distance of a volumetric data element to the nearest object surface point; and,
   means responsive to the distance of said volumetric data element to the nearest object surface point for estimating a surface normal thereof.

2. The system of claim 1, and further including means responsive to the distance of said volumetric data element to the nearest object surface point for estimating the magnitude of said surface normal.

3. The system of claim 1, wherein said distance encoding means includes means for generating a discrete volumetric distance map and means for generating a gradient vector at any point in the space that contains said surface from said distance map, said gradient pointing in the direction of a surface normal.

4. The system of claim 3, wherein a zero distance map value indicates the presence of a surface.

5. The system of claim 3, wherein a positive distance value indicates that said volumetric data element is inside said object.

6. A method for generating a volumetric distance map for a graphical object stored in a memory as voxels of a volume data set, comprising the steps of:
   measuring, for each voxel, a distance from that voxel to a nearest surface voxel; and,
   storing, with each voxel, the measured distance between that voxel and the nearest surface voxel.

7. The method of claim 6 further comprising the steps of:
   estimating a surface normal of each voxel from the measured distances.

8. The method of claim 7 further comprising the steps of:
   selecting an arbitrary viewing angle after storing the distances;
   rendering the volume data set according to the arbitrary viewing angle, the measured distances, and the estimated surface normals.

* * * * *